(12) United States Patent
Petersen et al.

(10) Patent No.: US 11,691,668 B2
(45) Date of Patent: Jul. 4, 2023

(54) HYDRAULIC STEERING ARRANGEMENT

(71) Applicant: Danfoss Power Solutions ApS, Nordborg (DK)

(72) Inventors: Morten Hoeck Petersen, Rodekro (DK); Jens Vester, Sonderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 474 days.

(21) Appl. No.: 16/840,521

(22) Filed: Apr. 6, 2020

(65) Prior Publication Data
US 2020/0317260 A1 Oct. 8, 2020

(30) Foreign Application Priority Data
Apr. 8, 2019 (DE) ...................... 10 2019 109 144.6

(51) Int. Cl.
*B62D 5/06* (2006.01)
*B62D 5/09* (2006.01)

(52) U.S. Cl.
CPC ............... *B62D 5/062* (2013.01); *B62D 5/09* (2013.01)

(58) Field of Classification Search
CPC .......... B62D 5/062; B62D 5/09; B62D 5/065; B62D 5/22
See application file for complete search history.

(56) References Cited

U.S. PATENT DOCUMENTS

| | | | |
|---|---|---|---|
| 4,972,916 A * | 11/1990 | Miller | B62D 7/159 180/414 |
| 5,947,140 A | 9/1999 | Aardema et al. | |
| 7,837,001 B2 * | 11/2010 | Young | B62D 5/093 180/441 |
| 8,121,770 B2 | 2/2012 | Zheng | |

(Continued)

FOREIGN PATENT DOCUMENTS

| CN | 101046215 A | 10/2007 |
|---|---|---|
| CN | 106043410 A | 10/2016 |

(Continued)

OTHER PUBLICATIONS

WO9914097A1 description machine translation; downloaded from Espacenet on Jan. 28, 2022; (Year: 2022).*

(Continued)

*Primary Examiner* — Kevin Hurley
*Assistant Examiner* — Harold Eric Pahlck, III
(74) *Attorney, Agent, or Firm* — McCormick, Paulding & Huber PLLC

(57) ABSTRACT

A hydraulic steering arrangement includes a supply port arrangement having at least a supply port, a return port arrangement having at least a return port, a working port arrangement having two working ports, a first valve arrangement having a first supply side connected to the supply port arrangement and a first output side connected to the working port arrangement, a second valve arrangement having a second supply side connected to the supply port arrangement and a second output side connected to the working port (Continued)

arrangement, and a steering command device. In a neutral steering angle, the second valve arrangement connects the first output side to the return port arrangement and the first valve arrangement connects the second output side to the return port arrangement.

20 Claims, 2 Drawing Sheets

(56) References Cited

U.S. PATENT DOCUMENTS

| | | | |
|---|---|---|---|
| 9,744,989 B1 | 8/2017 | Mahony, Jr. | |
| 11,014,604 B2* | 5/2021 | Pedersen | B62D 3/14 |
| 2013/0037340 A1* | 2/2013 | Brinkley | B62D 5/30 |
| | | | 180/421 |
| 2017/0158229 A1* | 6/2017 | Sullivan | B62D 5/30 |
| 2018/0119595 A1* | 5/2018 | Villegas Muriel | B62D 5/062 |
| 2019/0071119 A1* | 3/2019 | Takenaka | E02F 9/2004 |

FOREIGN PATENT DOCUMENTS

| | | |
|---|---|---|
| CN | 108602527 A | 9/2018 |
| CN | 108860304 A | 11/2018 |
| JP | S58-46256 A | 3/1983 |
| WO | 99/14097 A1 | 3/1999 |
| WO | 2007/090577 A1 | 8/2007 |

OTHER PUBLICATIONS

WO9914097A1 claims machine translation; downloaded from Espacenet on Jan. 31, 2022 (Year: 2022).*
WO2007090577A1 description machine translation; downloaded from Espacenet on Jan. 31, 2022 (Year: 2022).*
First Examination Report for Indian Patent Application No. 202014005017 dated Dec. 2, 2020.
First Office Action for Chinese Patent Application No. 202010198487.4 dated Jan. 30, 2022 and Its English Translation.

* cited by examiner

HYDRAULIC STEERING ARRANGEMENT

CROSS-REFERENCE TO RELATED APPLICATION

This application claims foreign priority benefits under 35 U.S.C. § 119 to German Patent Application No. 102019109144.6 filed on Apr. 8, 2019, the content of which is hereby incorporated by reference in its entirety.

TECHNICAL FIELD

The present invention relates to a hydraulic steering arrangement comprising a supply port arrangement having at least a supply port, a return port arrangement having at least a return port, a working port arrangement having two working ports, a first valve arrangement having a first supply side connected to the supply port arrangement and a first output side connected to the working port arrangement, a second valve arrangement having a second supply side connected to the supply port arrangement and a second output side connected to the working port arrangement, and a steering command device.

BACKGROUND

The steering command device is used by a driver to determine the direction in which a vehicle equipped with such a steering arrangement should be steered. The steering command device can be, for example, a steering wheel or a joystick. The steering command device can also be a member of a remote control or of a GPS steering in order to automatically steer the vehicle.

A problem in a hydraulic steering arrangement of this kind is a so-called dead band. The steering arrangement does not react immediately when the steering command device gives a corresponding steering signal. It is, for example, necessary that the driver rotates the steering wheel by 2° or 3° before the steering arrangement supplies hydraulic fluid to the working port arrangement.

SUMMARY

The object underlying the invention is to improve the steering behaviour.

This object is solved with a hydraulic steering arrangement as described at the outset in that in a neutral steering angle the second valve arrangement connects the first output side to the return port arrangement and the first valve arrangement connects the second output side to the return port arrangement.

In this way it is possible to establish a flow of hydraulic fluid from the supply port arrangement to one of the working ports and back to the return port arrangement via the first valve arrangement and the second valve arrangement and to establish a flow of hydraulic fluid from the supply port arrangement to the other of the working port arrangements and back to the return port arrangement via the second valve arrangement and the first valve arrangement. The pressures at the working ports can be kept equal or at a predetermined relation to each other, depending on a hydraulic actuator connected to the working ports. When steering is required, i. e. the pressures at the working ports have to be changed, it is only necessary to change the throttling resistance of at least one valve arrangement. This leads to an immediate reaction at the working port arrangement without any dead band or at least with a very small dead band. Unless described otherwise, the term "steering angle" is an abbreviation of an error between the steering angle given by the steering command device and a wheel angle reached.

In an embodiment of the invention in a predefined steering angle region around the neutral steering angle the first valve arrangement and the second valve arrangement have opposite opening behaviours. In other words, one of the valve arrangements moves to open further or to decrease a throttling resistance whereas the other valve arrangement closes further or increases the throttling resistance. The predefined steering angle region can, for example, cover the region in which previously the dead band has occurred.

In an embodiment of the invention the predefined region is from less than −3° to less than +3°.

In an embodiment of the invention the second valve arrangement is closed when the first valve arrangement reaches the border of the predefined region and the first valve arrangement is closed when the second valve arrangement reaches the border of the predefined region. When the steering command device outputs a steering command corresponding to a steering angle larger than the border of the predefined region, steering is performed under the control of a single valve arrangement only.

In an embodiment of the invention the first valve arrangement opens faster outside the predefined region than within the predefined region and the second valve arrangement opens faster outside the predefined region than within the predefined region. This behaviour takes into account that outside the predefined region the steering is controlled by one valve arrangement only.

In an embodiment of the invention the second valve arrangement starts connecting the first output side to the supply port arrangement, when the first valve arrangement reaches an open saturation state and the first valve arrangement starts connecting the second output side to the supply port arrangement, when the second valve arrangement reaches an open saturation state. The separation state can be, for example, a state wherein the respective valve arrangement is fully open and no further flow can be produced under the action of the respective valve arrangement. In such a situation the other valve arrangement which is closed up to this moment, can be opened to further supply hydraulic fluid to the respective working port. In other words, when one valve arrangement is reaching its maximum flow capacity, the other valve arrangement will cross over and help the already open valve and keep increasing its opening till both valves are fully open and the full flow is achieved.

In an embodiment of the invention a total flow through the first valve arrangement and the second valve arrangement from the supply port arrangement to the working port arrangement depends linearly on the steering angle. In other words, there is a proportional behaviour when the vehicle is driven by a driver and the steering behaviour is very comfortable for the driver. When the vehicle is driven automatically, the linear behaviour facilitates automatic control.

In an embodiment of the invention the steering command device is connected to control means, wherein the control means actuate the first valve arrangement and the second valve arrangement. The control means can, for example, operate the first valve arrangement and the second valve arrangement hydraulically or electrically. Thus, the control possibilities are improved.

In an embodiment of the invention the first valve arrangement comprises a first saturation indicator connected to the control means and the second valve arrangement comprises a second saturation indicator connected to the control means. The saturation indicator indicates the saturation state of the respective valve arrangement. This can basically be an on-off-indicator. However, in most cases it is preferred that the saturation indicator not only indicates a saturation state of the respective valve arrangement, but also indicates or detects an opening degree of the respective valve arrangement. This is in particular useful when the valve arrangement is controlled by the control means. The term "saturation indicator" is used for the sake of simplicity. Flow saturation is only one example. It is also possible to use one valve as a primary valve and the other one as a booster valve, depending on the steering direction. The booster valve can determine from the steering angle how much it must open.

In an embodiment of the invention the control means comprise a wheel angle sensor input. The wheel angle sensor input can be used to connect a wheel angle sensor to the control means, thus establishing a closed loop control.

In an embodiment of the invention the first steering valve arrangement and the second steering valve arrangement each comprise an electro-hydraulic valve. The electro-hydraulic valve can be a valve controlled by hydraulic pressures, wherein the hydraulic pressures are in turn controlled by solenoid valves. Other embodiments are possible.

BRIEF DESCRIPTION OF THE DRAWINGS

An embodiment of the invention will know be described in more detail with reference to the drawing, wherein.

DETAILED DESCRIPTION

Figure 1:
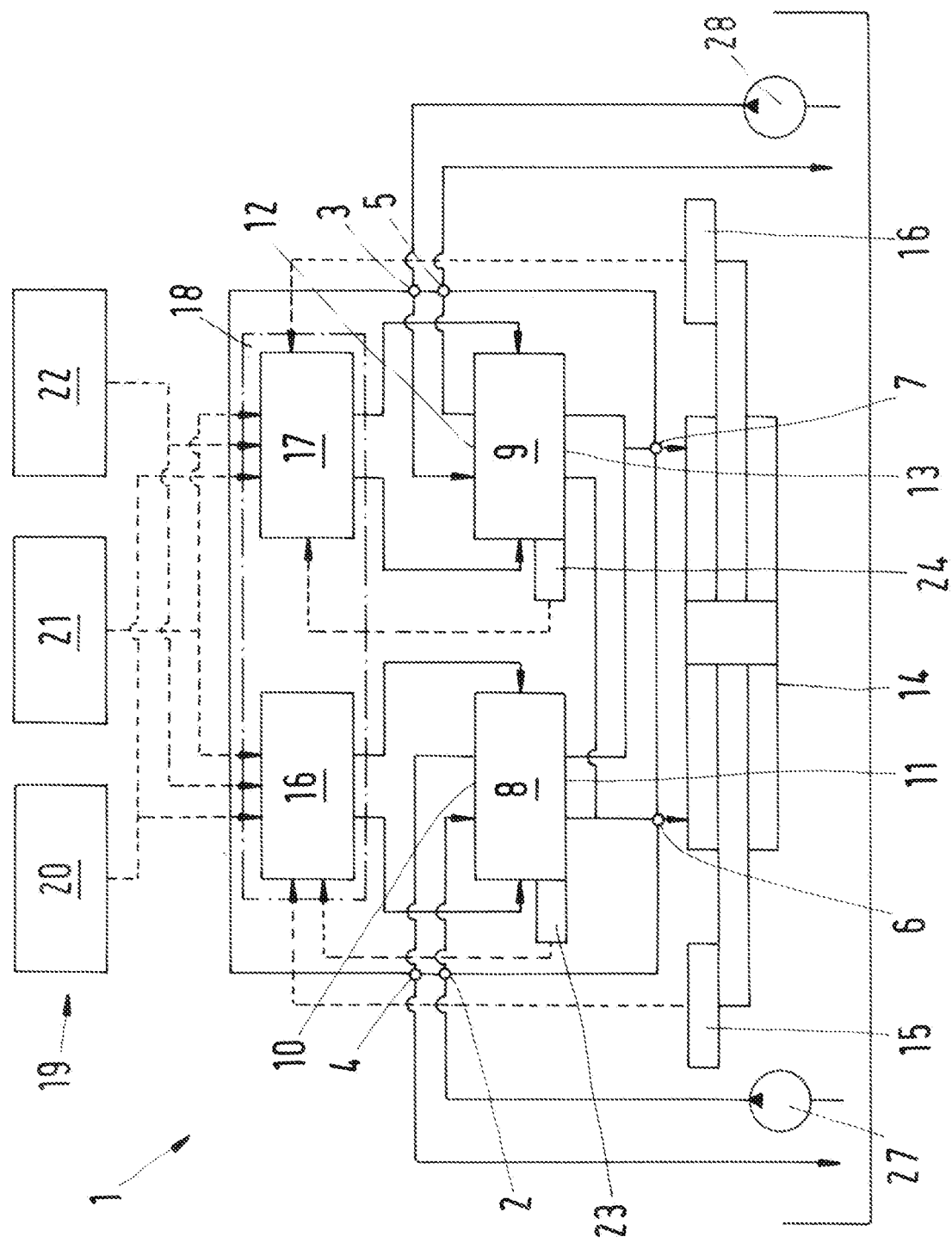
FIG. 1 shows schematically a hydraulic steering arrangement.

FIG. 1 schematically shows a hydraulic steering arrangement 1 comprising a supply port arrangement having two supply ports 2, 3, a return port arrangement having two return ports 4, 5, and a working port arrangement having two working ports 6, 7.

Furthermore, the steering arrangement 1 comprises a first valve arrangement 8 and a second valve arrangement 9. The first valve arrangement 8 comprises a first supply side 10 which is connected to the first supply port 2 and the first return port 4. Furthermore, the first valve arrangement 8 comprises a first output side 11 which is connected to the working ports 6, 7. In a similar manner the second valve arrangement 9 comprises a second supply side 12 connected to the second supply port 3 and the second return port 5 and a second output side 13 connected to the working ports 6, 7.

The two working ports 6, 7 are connected to a hydraulic actuator 14, for example a steering motor. The actuator 14 acts on steered wheels (not shown). For each steering direction a wheel angle sensor 15, 16 is provided. In the present embodiment the wheel angle sensors 15, 16 are connected to the actuator 14. It is, however, also possible to mount the wheel angle sensors 15, 16 to other parts or elements of the vehicle which are related to the angle of the steered wheels.

Each valve arrangement 8, 9 is controlled by a control unit 16, 17. More precisely the first valve arrangement 8 is controlled by a first control unit 16 and the second valve arrangement is controlled by a second control unit 17. Both control units 16, 17 together form control means 18.

The control means 18 are connected to a steering command device 19. Some embodiments of such a steering command device 19 are schematically shown. The steering command device 19 can be, for example, in form of a steering wheel 20, a joystick 21 or an auto guidance 22 which is used to steer a vehicle equipped with the steering arrangement 1 under GPS control.

The first valve arrangement 8 comprises a first position sensor 23 and the second valve arrangement 9 comprises a second position sensor 24. The position sensors 23, 24 detect the position of a valve element or spool of the respective valve arrangement 8, 9 or detect simply an opening degree of the respective valve arrangement 8, 9. In a simple embodiment the position sensors 23, 24 detect only whether the respective valve arrangement 8, 9 has reached a fully open state or another situation of separation. Thus, the position sensors 23, 24 can also be termed "saturation indicator".

The first position sensor 23 is connected to the first control unit 16. The second position sensor 24 is connected to the second control unit 17.

The operation of the steering arrangement 1 is described in connection with the characteristics of the two valve arrangements 8, 9 shown in FIG. 2. A first graph 25 shows the opening behaviour or throttling characteristic of the valve arrangement 8 and a graph 26 shows the opening behaviour or throttling characteristic of the second valve arrangement 9. The horizontal axis shows the steering angle, i. e. an error between a value specified or given by the steering command device 19 and the angle of the steered wheels returned by the wheel angle sensors 15. The vertical axis shows the flow commanded by the respective valve arrangements 8, 9, for example l/min.

In a neutral steering angle (0°) both valve arrangements 8, 9 are open, however, in different directions. In other words, the second valve arrangement 9 connects the first output side 11 to the return port arrangement 4, 5 and the first valve arrangement 8 connects the second output side 13 to the return port arrangement 4, 5. This means that, when no steering is required (i. e. no error between the steering angle given by the steering command device and the wheel angle) one of the valve arrangements 8, 9 will produce a little flow to one working port 6 and the other valve arrangement will produce a little flow to the other working port 7. The sum of the two flows will be zero and the actuator 14 is not actuated.

If steering is required to one side, one valve arrangement, for example the first valve arrangement 8, will close a bit and the other valve arrangement 9 will open a bit further. This leads to an immediate reaction of the pressure at the two working ports 6, 7. This behaviour continues, for example, in a range between −2.1° and +2.1°. Other ranges are possible. This range corresponds to the usual dead band. However, due to the permanent flow in the steering arrangement 1 there is no hydraulically caused dead band.

Figure 2:
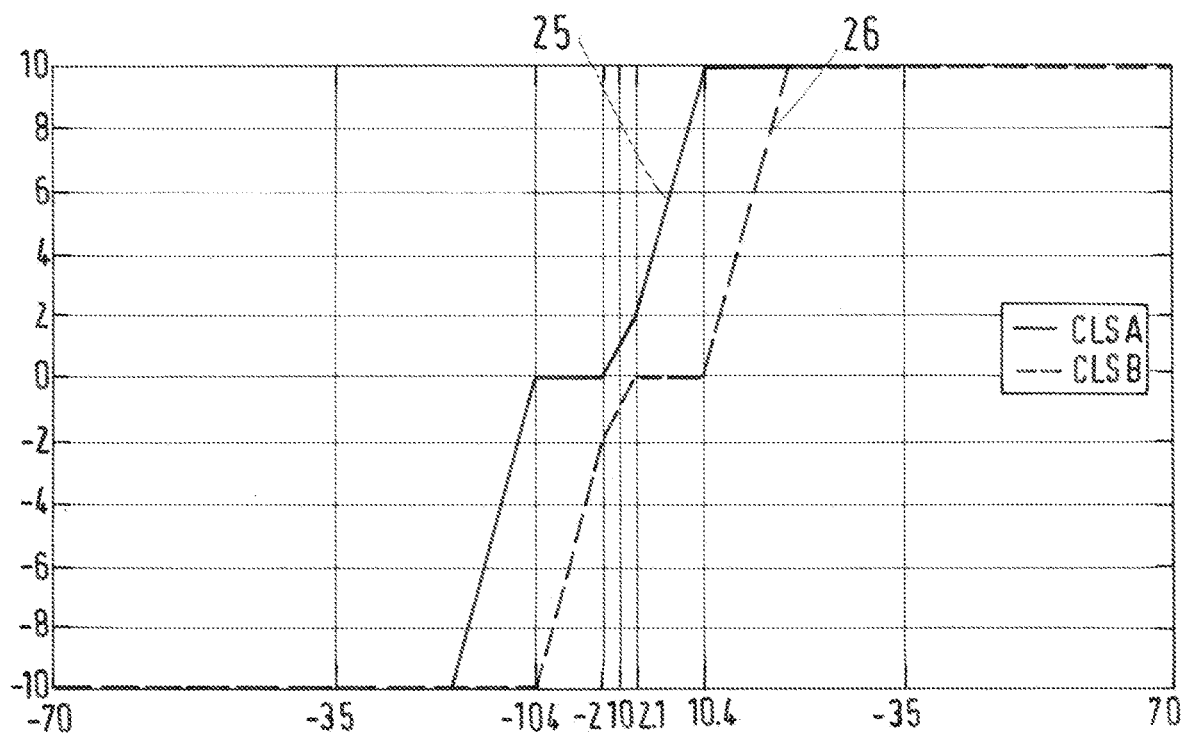
FIG. 2 shows schematically the flow characteristics of two valve arrangements.

As can be seen in FIG. 2, the second valve arrangement 26 is closed at the end of the range in one direction and the first valve arrangement 25 is closed at the end of the range in the other direction.

If a bit faster steering is required, i. e. when the difference between the angle given by the steering command device 19 and the wheel angle given by the wheel angle sensors 15, 16 is larger, one of the valve arrangements 8, 9 will remain close and the other valve arrangement 9, 8 will open more and faster. "faster" means that the increase of flow per increase of steering angle is larger than in the predefined range mentioned above.

When an even faster steering is required, i. e. the above-mentioned difference between the steering angle given by the steering command device 19 and the wheel angle returned by the wheel angle sensors 15, 16 is again larger, this may lead to the situation that the valve arrangement 8, 9 which is responsible for the steering in this direction, comes into a saturated state, i. e. it reaches its maximum flow capacity. This is symbolized by a horizontal branch at the upper end of graph 25 for the first valve arrangement 8 and a horizontal branch at the lower and of graph 26 for the second valve arrangement 9.

In this situation the other valve arrangement 9, 8 starts to open and "helps" the already open valve arrangement 8, 9 and keep increasing its opening (depending on the steering angle) until both valves are fully open and the full flow is achieved.

Figure 3:
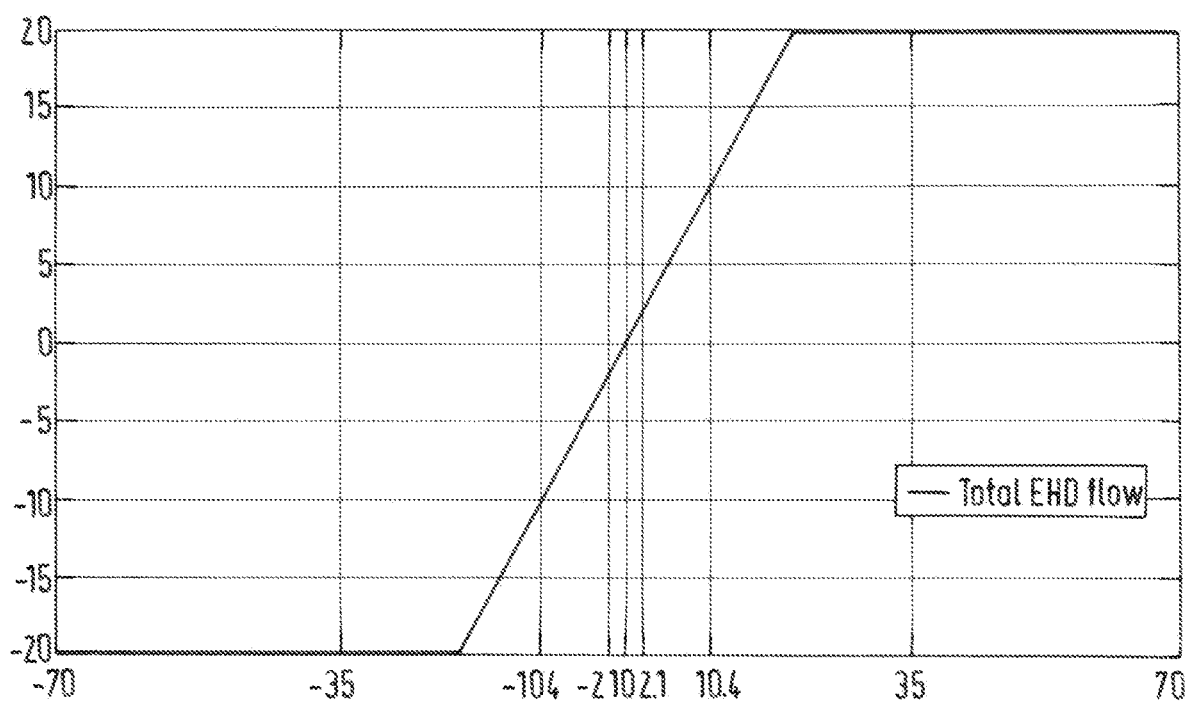
FIG. 3 shows the total flow behaviour of the hydraulic steering arrangement.

When the flows of the two valve arrangements 8, 9 are superimposed or added, a flow characteristic as shown in FIG. 3 is achieved. This flow characteristic is linear, i. e. the flow produced by the steering arrangement 1 depends linearly on the error between the steering angle given by the steering command device 19 and the wheel angle returned by the wheel angle sensors 15, 16.

In an embodiment of the invention the first valve arrangement 8 and the second valve arrangement 9 each comprise an electro-hydraulic valve, i. e. a valve in which the valve element or the spool is actuated hydraulically. The pressures for actuating the valve element is produced by means of solenoid valves. The solenoid valves, which may be arranged in form of a Wheatstone-bridge, may be arranged in the respective control units 16, 17. The embodiment shown in FIG. 1 comprises a supply port arrangement having two supply ports 2, 3 and a return port arrangement having two return ports 4, 5. Such an arrangement is of advantage, when two pumps 27, 28 are used, for example, for redundancy. It is, however, also possible to use only one supply port and one return port, if redundancy can be achieved in another way.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering arrangement comprising a supply port arrangement having at least a supply port, a return port arrangement having at least a return port, a working port arrangement having two working ports, a first valve arrangement having a first supply side connected to the supply port arrangement and a first output side connected to the working port arrangement, a second valve arrangement having a second supply side connected to the supply port arrangement and a second output side connected to the working port arrangement, and a steering command device, wherein in a neutral steering angle the second valve arrangement connects the first output side to the return port arrangement and the first valve arrangement connects the second output side to the return port arrangement.

2. The steering arrangement according to claim 1, wherein in predefined steering angle region around the neutral steering angle the first valve arrangement and the second valve arrangement have opposite opening behaviours.

3. The steering arrangement according to claim 2, wherein the predefined region is from less than −3° to less than +3°.

4. The steering arrangement according to claim 2, wherein the second valve arrangement is closed when the first valve arrangement reaches the border of the predefined region and the first valve arrangement is closed when the second valve arrangement reaches the border of the predefined region.

5. The steering arrangement according to claim 2, wherein the first valve arrangement opens faster outside the predefined region than within the predefined region and the second valve arrangement opens faster outside the predefined region than within the predefined region.

6. The steering arrangement according to claim 2, wherein the second valve arrangement starts connecting the first output side to the supply port arrangement, when the first valve arrangement reaches an open saturation state and the first valve arrangement starts connecting the second output side to the supply port arrangement, when the second valve arrangement reaches an open saturation state.

7. The steering arrangement according to claim 2, wherein a total flow through the first valve arrangement and the second valve arrangement from the supply port arrangement to the working port arrangement depends linearly on the steering angle.

8. The steering arrangement according to claim 1, wherein the steering command device is connected to control means, wherein the control means actuate the first valve arrangement and the second valve arrangement.

9. The steering arrangement according to claim 8, wherein the first valve arrangement comprises a first saturation indicator connected to the control means and the second valve arrangement comprises a second saturation indicator connected to the control means.

10. The steering arrangement according to claim 8, wherein the control means comprise a wheel angle sensor input.

11. The steering arrangement according to claim 8, wherein the first valve arrangement and the second valve arrangement each comprise an electro-hydraulic valve.

12. The steering arrangement according to claim 3, wherein the second valve arrangement is closed when the first valve arrangement reaches the border of the predefined region and the first valve arrangement is closed when the second valve arrangement reaches the border of the predefined region.

13. The steering arrangement according to claim 3, wherein the first valve arrangement opens faster outside the predefined region than within the predefined region and the second valve arrangement opens faster outside the predefined region than within the predefined region.

14. The steering arrangement according to claim 4, wherein the first valve arrangement opens faster outside the predefined region than within the predefined region and the second valve arrangement opens faster outside the predefined region than within the predefined region.

15. The steering arrangement according to claim 3, wherein the second valve arrangement starts connecting the first output side to the supply port arrangement, when the first valve arrangement reaches an open saturation state and the first valve arrangement starts connecting the second output side to the supply port arrangement, when the second valve arrangement reaches an open saturation state.

16. The steering arrangement according to claim 4, wherein the second valve arrangement starts connecting the first output side to the supply port arrangement, when the first valve arrangement reaches an open saturation state and the first valve arrangement starts connecting the second output side to the supply port arrangement, when the second valve arrangement reaches an open saturation state.

17. The steering arrangement according to claim 5, wherein the second valve arrangement starts connecting the first output side to the supply port arrangement, when the first valve arrangement reaches an open saturation state and the first valve arrangement starts connecting the second output side to the supply port arrangement, when the second valve arrangement reaches an open saturation state.

18. The steering arrangement according to claim 3, wherein a total flow through the first valve arrangement and the second valve arrangement from the supply port arrangement to the working port arrangement depends linearly on the steering angle.

19. The steering arrangement according to claim 4, wherein a total flow through the first valve arrangement and the second valve arrangement from the supply port arrangement to the working port arrangement depends linearly on the steering angle.

20. The steering arrangement according to claim 5, wherein a total flow through the first valve arrangement and the second valve arrangement from the supply port arrangement to the working port arrangement depends linearly on the steering angle.

\* \* \* \* \*